US012360836B2

(12) United States Patent
Kelm et al.

(10) Patent No.: US 12,360,836 B2
(45) Date of Patent: Jul. 15, 2025

(54) DATALOGGING CIRCUIT TRIGGERED BY A WATCHDOG TIMER

(71) Applicant: Apple Inc., Cupertino, CA (US)

(72) Inventors: John H. Kelm, Belmont, CA (US); Richard H. Larson, Saratoga, CA (US); Charles J. Fleckenstein, Portland, OR (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 18/529,472

(22) Filed: Dec. 5, 2023

(65) Prior Publication Data

US 2024/0118958 A1    Apr. 11, 2024

Related U.S. Application Data

(63) Continuation of application No. 17/656,153, filed on Mar. 23, 2022, now Pat. No. 11,853,148.

(60) Provisional application No. 63/247,693, filed on Sep. 23, 2021.

(51) Int. Cl.
*G06F 11/07* (2006.01)

(52) U.S. Cl.
CPC ...... *G06F 11/0757* (2013.01); *G06F 11/0724* (2013.01); *G06F 11/0778* (2013.01)

(58) Field of Classification Search
CPC ............ G06F 11/0757; G06F 11/0766; G06F 11/0778; G06F 11/0787; G06F 11/3476; G06F 11/348; G06F 11/349; G06F 11/3495

See application file for complete search history.

(56) References Cited

U.S. PATENT DOCUMENTS

| 10,104,176 | B2 | 10/2018 | Kutch | |
|---|---|---|---|---|
| 2007/0038899 | A1* | 2/2007 | O'Brien | G06F 11/0709 |
| | | | | 714/E11.023 |
| 2013/0254586 | A1* | 9/2013 | Winger | G06F 11/0742 |
| | | | | 714/E11.138 |
| 2014/0300337 | A1 | 10/2014 | Wright | |
| 2015/0039747 | A1 | 2/2015 | Meloche | |
| 2017/0031862 | A1 | 2/2017 | Yu | |
| 2018/0137007 | A1* | 5/2018 | Hayashi | G06F 9/4401 |

(Continued)

FOREIGN PATENT DOCUMENTS

JP    5818257 B2    11/2015

*Primary Examiner* — Gabriel Chu
(74) *Attorney, Agent, or Firm* — Kowert, Hood, Munyon, Rankin & Goetzel, P.C.; Scott W. Pape; Dean M. Munyon

(57) ABSTRACT

An apparatus includes a memory circuit, and an integrated circuit formed on a single semiconductor substrate and coupled to the memory circuit. The integrated circuit includes a watchdog timer, a plurality of functional circuits coupled together via a communication fabric, and a system management circuit coupled to the watchdog timer and to a subset of the functional circuits via respective dedicated point-to-point interfaces. A given functional circuit may be configured to repeatedly reset the watchdog timer before the watchdog timer expires. The system management circuit may be configured, in response to an expiration of the watchdog timer, to access information in the subset of the functional circuits via the respective point-to-point interfaces. The system management circuit may be further configured to store the accessed information in the memory circuit.

20 Claims, 8 Drawing Sheets

(56) References Cited

U.S. PATENT DOCUMENTS

| | | | |
|---|---|---|---|
| 2019/0243701 A1* | 8/2019 | Kurts | G06F 9/3861 |
| 2020/0174873 A1* | 6/2020 | Toupal | G06F 11/0775 |
| 2021/0072924 A1 | 3/2021 | Li et al. | |
| 2021/0271537 A1* | 9/2021 | Gong | G06F 13/4295 |

* cited by examiner

*400*

```
┌─────────────────────────────────────────────────┐
│ Repeatedly resetting a watchdog timer by         │
│ software running on one or more of a plurality   │
│ of processors on a same integrated circuit.      │
│ 410                                              │
└─────────────────────────────────────────────────┘
                        │
                        ▼
┌─────────────────────────────────────────────────┐
│ In response to an expiration of the watchdog     │
│ timer, logging, by a system management circuit   │
│ included on the integrated circuit, information  │
│ from a subset of a plurality of component        │
│ circuits via respective dedicated point-to-point │
│ interfaces, wherein the plurality of component   │
│ circuits includes the plurality of processors.   │
│ 420                                              │
└─────────────────────────────────────────────────┘
                        │
                        ▼
┌─────────────────────────────────────────────────┐
│ Storing the logged information in a memory       │
│ circuit that retains stored values through a     │
│ reset of the integrated circuit.                 │
│ 430                                              │
└─────────────────────────────────────────────────┘
```

```
┌─────────────────────────────────────────────────────────────┐
│ Logging, by the system management circuit, the subset of the functional │
│                  circuits in a particular order.            │
│                            510                              │
└─────────────────────────────────────────────────────────────┘
                              ↓
┌─────────────────────────────────────────────────────────────┐
│ Repeatedly resetting the watchdog timer, by the system management │
│                  circuit, during the logging.               │
│                            520                              │
└─────────────────────────────────────────────────────────────┘
                              ↓
┌─────────────────────────────────────────────────────────────┐
│ In response to determining that a particular functional circuit is │
│ unresponsive, logging a next functional circuit in the particular order │
│ without receiving respective information for the particular functional │
│                            circuit.                         │
│                            530                              │
└─────────────────────────────────────────────────────────────┘
                              ↓
┌─────────────────────────────────────────────────────────────┐
│ Ceasing, by the system management circuit, to reset the watchdog timer │
│ in response to determining that the logging has completed.  │
│                            540                              │
└─────────────────────────────────────────────────────────────┘
```

*FIG. 5*

DATALOGGING CIRCUIT TRIGGERED BY A WATCHDOG TIMER

PRIORITY CLAIM

The present application is a continuation of U.S. application Ser. No. 17/656,153, entitled "Datalogging Circuit Triggered by a Watchdog Timer," filed Mar. 23, 2022, which claims priority to U.S. Provisional Appl. No. 63/247,693, entitled "Datalogging Circuit Triggered by a Watchdog Timer," filed Sep. 23, 2021, the disclosures of which are incorporated by reference herein in their entireties.

BACKGROUND

Technical Field

Embodiments described herein are related to systems-on-a-chip (SoCs) and, more particularly, to methods for data logging states of functional circuits in an SoC.

Description of the Related Art

When a computing device crashes in the field, a data log may be collected and sent to a provider of hardware and/or software associated with the device. This data log may be used to determine future improvements for the hardware and/or software. Traditionally, the data is collected by software (e.g., a kernel in the operating system) executing on one or more processor cores when unexpected behavior of the device is detected, such as a particular portion of hardware and/or software becoming unresponsive. The software may issue memory requests for relevant data from a plurality of components within the device. If, however, the operating system itself is hung or otherwise unable to detect the unexpected behavior, then no data may be collected, and a potential failure mode may be left undetected.

SUMMARY

In an embodiment, an apparatus includes a memory circuit, and an integrated circuit formed on a single semiconductor substrate and coupled to the memory circuit. The integrated circuit includes a watchdog timer, a plurality of functional circuits coupled together via a communication fabric, and a system management circuit coupled to the watchdog timer and to a subset of the functional circuits via respective dedicated point-to-point interfaces. A given functional circuit of the plurality may be configured to repeatedly reset the watchdog timer before the watchdog timer expires. The system management circuit may be configured, in response to an expiration of the watchdog timer, to access information in the subset of the functional circuits via the respective point-to-point interfaces, and to store the accessed information in the memory circuit.

In a further example, to access the information in the subset of the functional circuits, the system management circuit may be configured to halt a particular functional circuit, and to cause the particular functional circuit to send the information to the system management circuit. In an example, the particular functional circuit may be configured to remain halted until a reset signal is received.

In another example, the accessed information may include any one or more of a process identifier for a software process being executed by a particular one of the subset of the functional circuits, an indication of a recently retired instruction for a software process being executed by a particular one of the subset of the functional circuits, and a pending memory request issued by a particular one of the subset of the functional circuits. In a further example, a particular one of the subset of the functional circuits may be a power management circuit that includes a plurality of registers with values that are indicative of operating states of others of the subset of the functional circuits.

In an embodiment, the system management circuit may be further configured to access particular ones of the plurality of registers based on current power states of the subset of the functional circuits. In another embodiment, the power management circuit may be configured to restrict access by the system management circuit to a subset of the plurality of registers.

In a further example, the system management circuit may be further configured to access the subset of the functional circuits in a particular order. In response to a determination that a particular functional circuit is unresponsive, accessing a next functional circuit in the particular order without receiving respective information for the particular functional circuit.

BRIEF DESCRIPTION OF THE DRAWINGS

The following detailed description makes reference to the accompanying drawings, which are now briefly described.

FIG. 4 depicts a flow diagram of an embodiment of a method for data logging functional circuits in an integrated circuit.

FIG. 5 shows a flow diagram of an embodiment of a method for managing an unresponsive functional circuit while performing a data log operation.

Figure 1:
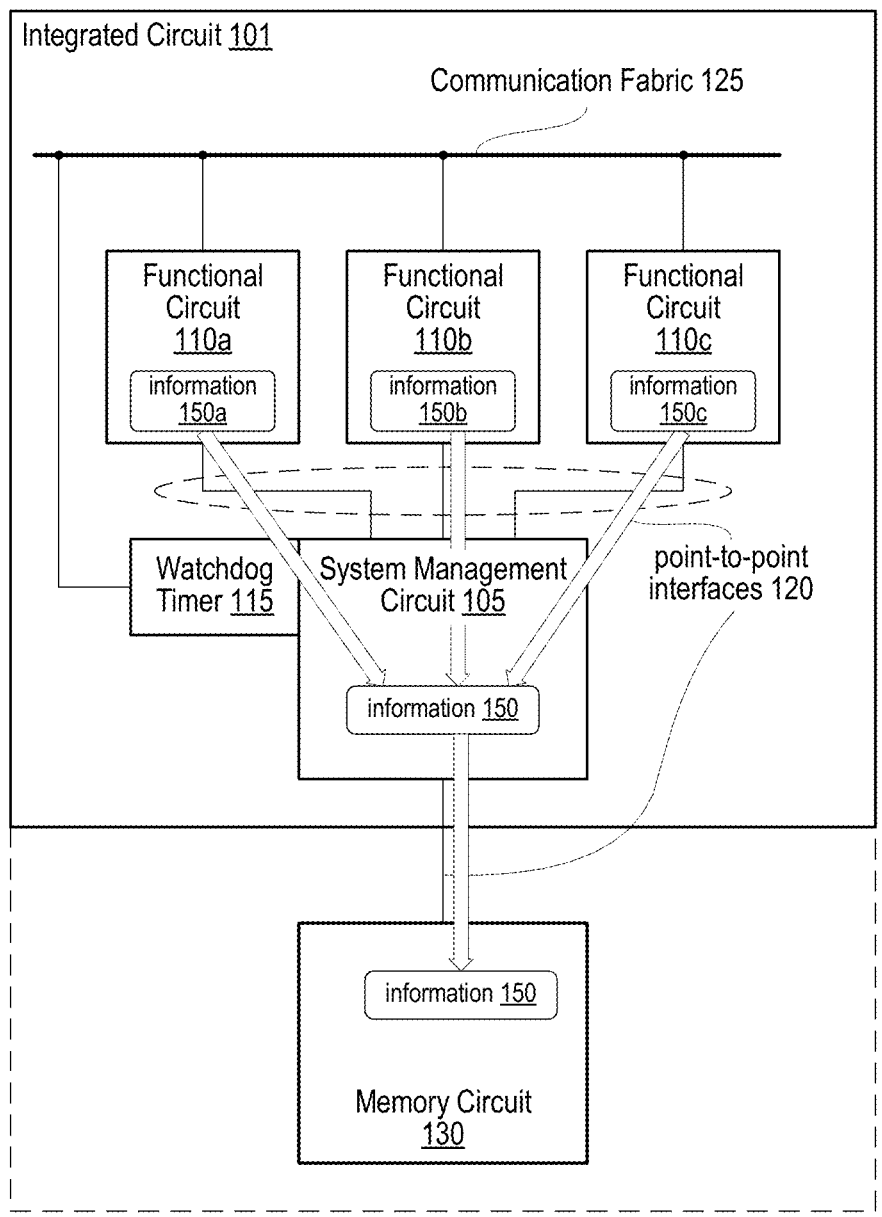
FIG. 1 illustrates a block diagram of an embodiment of a system that includes an integrated circuit with a system management circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

A software program executing on a computer system may include instructions for resetting a watchdog timer. As used herein, a "watchdog timer" is a timer circuit that, when enabled, continuously counts (either up or down) from a starting value to a trigger threshold value using a given clock signal. When the watchdog timer reaches the trigger threshold (also referred to as "expiring" or "timing out"), the watchdog timer may assert an interrupt or other type of exception signal, which may, in turn, trigger other hardware and/or software to perform particular tasks. The watchdog timer, when using a stable clock signal, takes a determinate amount of time (a "timeout period") to expire after being reset. Resetting the watchdog timer sets the count to the starting value. Resetting the count before the watchdog timer expires may initiate a fresh timeout period, thereby delaying the watchdog expiration. Hardware and/or software in the computer system may be configured to reset the watchdog timer repeatedly within a timeout period. As long as the hardware/software is operating properly, the watchdog timer is repeatedly reset and no expiration occurs.

If, however, the hardware/software is not operating properly or otherwise becomes unresponsive, then the reset of the watchdog timer may not occur and the watchdog timer is allowed to expire, thereby asserting a timeout signal. This timeout signal may be used to trigger a collection of a data log. The unexpected behavior of the computer system, however, may be caused, at least in part, by unexpected operation of a central element of the computer system that may prevent traditional methods of data logging from being performed. For example, if a main communication fabric on an integrated circuit (IC) becomes unresponsive to communication requests, then accesses to various components on the IC may be prevented, thereby preventing collection of the data log.

The present disclosure considers a novel digital circuit on an IC that responds to a timeout of a watchdog timer, also on the IC, by data logging various components. To avoid reliance on a central communications fabric or other system-level bus, the disclosed watchdog data logging circuit utilizes a plurality of dedicated point-to-point interfaces to communicate with each component to be logged. In response to the watchdog timer expiring, the novel watchdog data logging circuit uses the dedicated point-to-point interfaces to request various types of information from each of the logged components. The collected data may then be stored in memory to be sent to a provider of the hardware and/or software when a communication link is available. By utilizing a watchdog timer as a trigger for detecting unexpected behavior and utilizing dedicated point-to-point interfaces to request data from components to be data logged, this watchdog data logging circuit may be capable of data logging components even when an operating system and/or communication fabric is operating in an unexpected manner. Accordingly, information from more failure modes may be captured and sent back to a product developer to determine changes to hardware/software/firmware to prevent future occurrences of the unexpected operating behavior.

FIG. 1 illustrates a block diagram of one embodiment of a system with an integrated circuit that includes a system management circuit that performs data logging of functional circuits. As illustrated, system 100 includes integrated circuit 101 and memory circuit 130. In various embodiments, memory circuit may be included within integrated circuit 101 on a same semiconductor substrate, or as an external memory circuit on a same or different circuit board as integrated circuit 101. Integrated circuit 101 includes system management circuit 105, watchdog timer 115, and a plurality of functional circuits 110a-110c (collectively, functional circuits 110). Functional circuits 110 are coupled to one another via communication fabric 125. System management circuit 105 is coupled to each of functional circuits 110 via respective point-to-point interfaces 120.

As illustrated, functional circuits 110 correspond to any suitable type of component circuit that may be implemented on integrated circuit 101 to perform one or more functions. For example, one or more of functional circuits 110 may be a processor core capable of executing instructions of a particular instruction set. In some embodiments, functional circuits 110 may correspond to a general-purpose processor core and a plurality of co-processor circuits, such as a floating-point processor, graphics processor, audio processor, encryption engine, and the like. One or more of functional circuits 110 may include network interfaces such as an Ethernet interface, a universal serial bus (USB) interface, a Wi-Fi or cellular wireless interface, and so forth. One or more of functional circuits 110 may also include various system configuration circuits, such as power and/or clock management circuits.

During normal operation, functional circuits 110 may communicate with one another using communication fabric 125. Communication fabric 125, as shown, includes one or more bus structures for transmitting various requests and responses among functional circuits 110 as well as other circuits that may be included on integrated circuit 101. Communication fabric 125 may further include access nodes and/or other routing circuits for managing the flow of communication traffic across integrated circuit 101.

Memory circuit 130, as shown, includes memory cells and related circuitry for receiving and storing information from system management circuit 105. Memory circuit 130 is configured to retain stored values through a reset of system 100. In some embodiments, memory circuit 130 may be implemented as a non-volatile memory circuit such as flash memory, ferroelectric random-access memory (FRAM), or magnetoresistive RAM (MRAM), located either on integrated circuit 101 or on a different chip. In other embodiments, memory circuit 130 may be a volatile memory such as static or dynamic RAM, also located either on integrated circuit 101 or on a different chip. Memory circuit 130 may be a portion of a system memory accessible to one or more of functional circuits 110 via communication fabric 125. As shown, memory circuit 130 is dedicated for use by a limited number of circuits, including system management circuit 105, accessible, for example, via one of point-to-point interfaces 120.

Watchdog timer 115, similar to the description above, is a timer circuit that continuously counts from an initial value to a threshold value based on pulses of an available clock signal. After timing out, watchdog timer 115 asserts an exception signal that may be received by various control circuits across integrated circuit 101, including system management circuit 105. The initial and threshold values may be any suitable value and watchdog timer 115 may, accordingly, count either up or down from the initial value to the threshold value.

A given functional circuit 110 of the plurality of functional circuits 110 is configured to repeatedly reset watchdog timer 115 before watchdog timer 115 expires. For example, functional circuit 110a may be a processor core that is executing software instructions associated with an operating system. Executing particular ones of the software instructions cause watchdog timer 115 to reset its count to the initial value. These software instructions may be implemented in a manner that causes functional circuit 110a to repeatedly reset watchdog timer 115 within a timeout period, thereby avoiding a time out as long as functional circuit 110a is capable of executing the software instructions with an expected frequency.

As illustrated, system management circuit 105 includes circuitry for managing and/or maintaining status for various system operations in integrated circuit 101. For example, system management circuit 105 may include registers for enabling/disabling particular interrupt and exception sources as well as for monitoring a status of enabled sources. System management circuit 105 may include registers for certain security options, such as enabling security trust zones and managing functional circuits capable of accessing these trust zones.

System management circuit 105 may also receive timeout signals from one or more watchdog circuits, including watchdog timer 115. As shown, system management circuit 105 is coupled to watchdog timer 115, and is configured, in response to an expiration of watchdog timer 115, to access information 150*a*-150*c* in functional circuits 110 via the respective ones of point-to-point interfaces 120. The expiration of watchdog timer 115 may be indicative of unexpected behavior within system 100. Software instructions executed by functional circuit 110*a* are expected to reset watchdog timer 115 within a timeout period, thereby avoiding a watchdog timeout. Detecting the expiration of watchdog timer 115, therefore, indicates that some type of event occurred that prevented functional circuit 110*a* from resetting watchdog timer 115 as expected. System management circuit 105 includes circuits that are configured to collect information 150 from functional circuits 110. Information 150, in some cases, may include data that is indicative of the event that resulted in the expiration of watchdog timer 115, such as power and clock modes in which each respective functional circuit 110 was operating, indications of particular instructions or tasks respective functional circuits were performing, and the like.

To access information 150*a*-150*c* in functional circuits 110, system management circuit 105 is configured to halt a particular functional circuit 110, and then to cause the particular functional circuit 110 to send its portion of information 150 to system management circuit 105. As illustrated, system management circuit 105 is configured to access each of functional circuits 110 serially, in a particular order. Other than halting the particular functional circuit 110, this access may not cause a change in state of the particular functional circuit 110. By halting the particular functional circuit 110, the current state can be frozen, resulting in individual collected values of information 150 being associated with a common point in time. In contrast, if operation of the particular functional circuit 110 was not halted, then various values collected as information 150 may be captured on different clock cycles and, therefore, may not be related to a common point in time.

For example, the order may be functional circuit 110*a*, then 110*b*, and then 110*c*. Accordingly, system management circuit 105 may access, via a respective one of point-to-point interfaces 120, information 150*a* from functional circuit 110*a*, and then store the accessed information 150 in memory circuit 130. This process may be repeated by system management circuit 105 to access information 150*b* and 150*c*. In some embodiments, system management circuit 105 may collect all information 150 internally first, and then store information 150 in memory circuit 130 after all functional circuits 110 have been accessed.

During a watchdog timeout event, one or more functional circuits that have point-to-point interfaces with system management circuit 105 may not function properly and, therefore, demonstrate erratic behavior. In such cases, it may be possible for the malfunctioning functional circuit to inadvertently send a response to system management circuit 105. Accordingly, system management circuit 105 may, in some cases, receive an unrequested response. To avoid logging erroneous data, system management circuit 105 may ignore and/or delete the unrequested response.

The collected data may be sent to a producer of system 100 and/or software developer that created software running on system 100. For example, system 100, or at least integrated circuit 101, may be reset after information 150 has been collected. After such a reset, system 100 may be capable of accessing a network (e.g., Wi-Fi, cellular, Ethernet, etc.) and use this network to send information 150 to the appropriate entity.

Use of system management circuit 105 to data log functional circuits 110 in response to an expiration of watchdog timer 115 may allow collection of data related to a particular failure mode or other type of event that would be desirable to avoid. The entity receiving information 150 may then be able to use information 150 to identify a cause of the undesired behavior and determine a modification to fix the issue in a next revision of a hardware or software product.

It is noted that system 100, as illustrated in FIG. 1, is merely an example. The illustration of FIG. 1 has been simplified to highlight features relevant to this disclosure. Various embodiments may include different configurations of the circuit elements. For example, although three functional circuits 110 are shown, any suitable number of functional circuits may be included in other embodiments. In addition, system management circuit 105 may be configured to collect information of a subset of all functional circuits included in integrated circuit 101.

In FIG. 1, a system management circuit coupled to various functional circuits via respective point-to-point interfaces is shown. Such circuits may be implemented, and may operate, in various fashions. An example of an embodiment of an integrated circuit is shown with more detail in FIG. 2.

Figure 2:
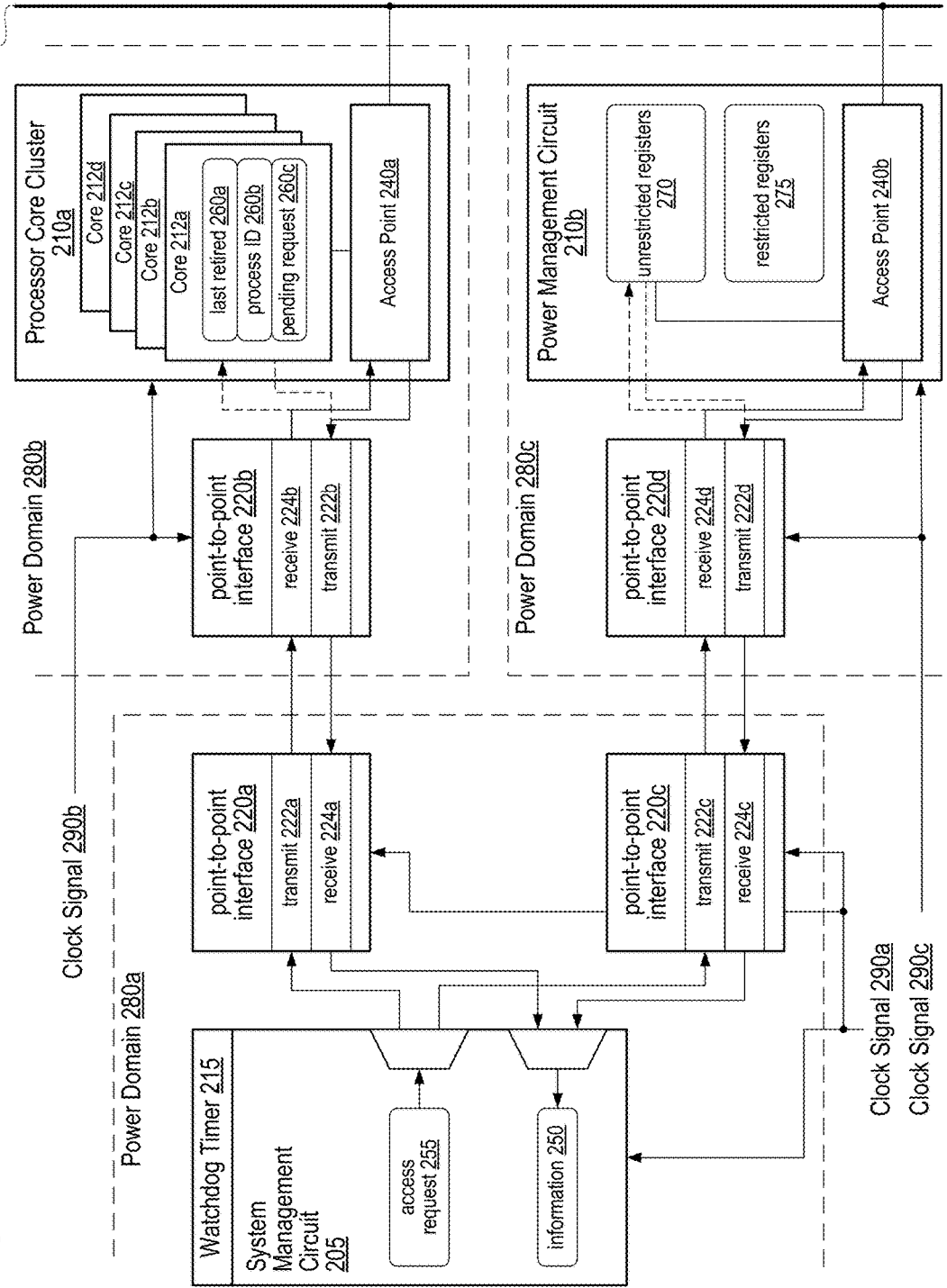
FIG. 2 shows a block diagram of an embodiment of an integrated circuit with a system management circuit coupled to a processor core cluster and a power management circuit.

Moving to FIG. 2, a block diagram of an embodiment of an integrated circuit with data logging capabilities is shown. Integrated circuit 201 may, in some embodiments, depict an implementation of integrated circuit 101 in FIG. 1, and accordingly, similarly named and numbered elements function as described above except as disclosed below. As illustrated, integrated circuit 201 includes system management circuit 205, processor core cluster 210*a*, and power management circuit 210*b*. System management circuit 205 communicates with processor core cluster 210*a* and power management circuit 210*b* via point-to-point interfaces 220*a*-220*d* (collectively, point-to-point interfaces 220). As depicted, integrated circuit 201 includes power domains 280*a*-280*c* (collectively, power domains 280).

Processor core cluster 210*a*, in some embodiments, corresponds to one of functional circuits 110 in FIG. 1. As shown, processor core cluster 210*a* includes four cores 212*a*-212*d* (collectively, cores 212) that are couple to communication fabric 225 via access point 240*a*. Processor cores 212 may, in various embodiments, be four instantiations of a same core design, four different core designs, or a combination thereof. For example, cores 212*a* and 212*b* may be general purpose cores capable of executing instructions from a given instruction set architecture (ISA), while cores 212*c* and 212*d* are instantiations of one or more different core designs such as graphics, audio, or security processors. Cores 212 may communicate among one another via a local bus and communicate with other circuits in integrated circuit 201 via access point 240*a* which is, in turn, coupled to communication fabric 225.

In a similar manner as processor core cluster 210*a*, power management circuit 210*b*, may correspond to one of functional circuits 110 in FIG. 1. Power management circuit 210*b* includes circuits for managing power modes for various components on integrated circuit 201. For example, power management circuit 210*b* may include circuits for selecting a particular power mode for each of cores 212. In some embodiments, these power mode selections may determine a voltage level of a power supply and/or a frequency of a clock signal supplied to each core 212. As shown, power management circuit 210*b* includes two groups of registers for performing the power management tasks, including unrestricted registers 270 and restricted registers 275. Current values of these registers may provide an indication of a current state of a respective core 212 and other components of integrated circuit 201. Unrestricted registers 270 include registers that are open for any processing circuit with access to power management circuit 210*b* to read and/or write. Restricted registers 275, on the other hand, are accessible only to authorized processing circuits, and therefore may not be accessible to all processing circuits with access to power management circuit 210*b*. As shown, power management circuit 210*b* is accessed from communication fabric 225 via access point 240*b*. Access point 240*b* or other circuits within power management circuit 210*b* may enforce access limitations to restricted registers 275.

In a similar manner as described above, system management circuit 205 includes or is coupled to watchdog timer 215. Watchdog timer 215 may be reset by one or more of cores 212 (e.g., core 212*a*), in response to executing particular instructions. Access to watchdog timer 215 may, in some embodiments, be via communication fabric 225. An unexpected event may result in core 212*a* being unable to reset watchdog timer 215 before watchdog timer 215 expires. For example, core 212*a* may cease to operate normally due to fetching an instruction or data from a corrupted memory location, thereby causing core 212*a* to execute an incorrect instruction or to access an incorrect memory address. Such an operational error may not cause a fatal error, but instead allow core 212*a* to continue processing incorrect instructions and/or data, and resulting in a skip of a reset of watchdog timer 215. In other cases, core 212*a* may be operating correctly, but may otherwise become "stuck" due to another circuit failing to operate correctly. For example, a different core 212 or other processing circuit (not shown) in integrated circuit 201 may operate improperly and could flood communication fabric 225 with a series of memory accesses that cause communication fabric to become overloaded and therefore unresponsive, thereby shutting down communication across some or all of integrated circuit 201. In such a case, core 212*a* may not be able to communicate with watchdog timer 215 and, therefore, not be able to cause a reset of the watchdog count value.

In response to an expiration of watchdog timer 215, system management circuit 205 begins logging information from at least a subset of functional circuits on integrated circuit 201, including, e.g., processor core cluster 210*a* and power management circuit 210*b*. Since, in some cases, communication fabric 225 may not be available after a watchdog timeout event, system management circuit 205 uses point-to-point interfaces to communicate to the subset of functional circuits. As shown, system management circuit 205 communicates with processor core cluster 210*a* via point-to-point interfaces 220*a* and 220*b*, and to power management circuit 210*b* via point-to-point interfaces 220*c* and 220*d*.

In some embodiments, point-to-point interfaces 220 may cross power domains 280. As illustrated, system management circuit 205 is in power domain 280*a*, processor core cluster 210*a* is in power domain 280*b*, and power management circuit 210*b* is in power domain 280*c*. Under various conditions, the three power domains 280 may set to two or three different voltage levels. To enable communication, point-to-point interfaces 220 are configured to communicate across power domains 280. To communicate with processor core cluster 210*a*, point-to-point interface 220*a* is in power domain 280*a* and is coupled to point-to-point interface 220*b* in power domain 280*b*. Each of point-to-point interface 220*a* and 220*b* may include level shifting circuits for translating signals received from a different power domain 280. Similarly, point-to-point interface 220*c* is also in power domain 280*a* and is coupled to point-to-point interface 220*d* in power domain 280*c* to facilitate communication to power management circuit 210*b*.

Although not illustrated, in some embodiments, connections between two point-to-point interfaces (e.g., 220*a* and 220*b*), may pass through one or more intermediate power domains. The described level shifting may, in some embodiments, be implemented within each power domain. These intermediate power domains, however, may not include power domains that can be powered off while power domains 280*a* and 280*b* are active.

As an example, to send access request 255 to processor core cluster 210*a*, system management circuit 205 selects point-to-point interface 220*a* and sends access request 255 via transmit circuit 222*a*. A transmit signal is generated in power domain 280*a* which is received by receive circuit 224*b* in point-to-point interface 220*b*. Receive circuit 224*b* may include level shifting circuits to translate the received signal from power domain 280*a* into power domain 280*b*. Receive circuit 224*b* transmits the received access request 255 to processor core cluster 210*a*. In some embodiments, point-to-point interface 220*b* communicates to cores 212 via access point 240*a*. In other embodiments, point-to-point interface 220*b* communicates directly to cores 212.

Furthermore, point-to-point interface 220*b* may communicate to a single predetermined one of cores 212, and the predetermined core 212 may then gather information for itself and for the other ones of cores 212. Information 250 is collected in processor core cluster 210*a* and returned to system management circuit 205 using transmit circuit 222*b* and receive circuit 224*a* to cross from power domain 280*b* to power domain 280*a*. To communicate with power management circuit 210*b*, system management circuit 205 uses a similar process, selecting point-to-point interface 220*c*, instead of 220*a*, through which to send access request 255.

In some embodiments, system management circuit 205 may issue a single access request at a given time. For example, after access request 255 is sent to processor core cluster 210*a*, no further access request may be issued until either a response that includes information 250 is received or an allotted amount of time for receiving the response expires. If no response is received within the allotted amount of time, then system management circuit 205 may consider processor core cluster 210*a* as unresponsive and proceed to issue a different access request to a different functional circuit, such as power management circuit 210*b*.

In addition to crossing power domains, point-to-point interfaces 220 may also cross clock domains. As shown, system management circuit 205 receives clock signal 290*a*, processor core cluster 210*a* receives clock signal 290*b*, and power management circuit 210*b* receives clock signal 290*c*. While, in some cases, clock signals 290 may have a common frequency, under some conditions one or more of the clock frequencies may differ. To facilitate communication across the clock domains under various conditions, point-to-point interfaces are synchronous. Although a single line is drawn from a given transmit circuit 222 to a corresponding receive circuit 224, this line may represent multiple connections, including one or more data lines and a clock line to support synchronization. In some embodiments, a ready signal may also be included to further facilitate handshaking during transfer of requests and information packets.

As stated above, the logged information may include a variety of values from a given functional circuit. For example, cores 212 may include indications of last retired instructions 260a for a software process being executed by the respective core 212, values for process identifier (ID) 260b for the software process, and pending memory requests 260c issued by the respective core 212. Although not illustrated, software executing on a respective one of cores 212 may additionally store annotations, e.g., particular values associated with a current operating state of the software, in registers or other memory locations that are accessible by system management circuit 105. The logged information may be useful for determining a cause of the unexpected event that resulted in the expiration of watchdog timer 215.

In addition, system management circuit 205 may log information from power management circuit 210b. As stated, power management circuit 210b includes a plurality of unrestricted registers 270 with values that are indicative of operating states of others functional circuits in integrated circuit 201. Such information may be indicative of, for example, operating modes of each of cores 212, voltage levels of each of power domains 280, frequencies of each of clock signals 290, and the like. Logging of some registers may be skipped based on the current values. For example, logging of a portion of unrestricted registers 270 that are associated with a core 212 that is currently powered down may be skipped. If core 212b is in a powered down or other type of idle state, then any of unrestricted registers 270 that correspond to core 212b may, in some embodiments, be omitted. System management circuit 205 may be further configured to skip sending an access request to core 212b based on its current power state.

In some embodiments, power management circuit 210b is configured to limit access by system management circuit 205 to restricted registers 275, regardless of the contents of a received access request. Power management circuit 210b may include, in restricted registers 275, information that may be treated as confidential or that otherwise could be used to compromise the integrity of integrated circuit 201.

It is noted that, as illustrated, some values logged by system management circuit 205 may be read from "architecturally visible" registers which, as used herein, refer to registers that are included in a processor's register map. A processor core may be capable of executing an instruction that addresses an architecturally visible register. For example, unrestricted registers 270 may be architecturally visible. Other logged values may not be architecturally visible. For example, last retired instruction 260a, process ID 260b, and pending memory request 260c may not be architecturally visible and may be tracked within the respective cores 212 for debug purposes. As such, the logging of such otherwise difficult to access information may provide valuable clues as to what caused the unexpected event that resulted in the expiration of watchdog timer 215.

As described in regard to FIG. 1, the logged values may be stored in memory circuit 130. In some embodiments, memory circuit 130 is external to integrated circuit 201, while in other embodiments, memory circuit 130 is included within integrated circuit 201. Although not illustrated, in some embodiments memory circuit 130 may include static RAM included within system management circuit 205 or at least within power domain 280a. Such embodiments may reduce risk of losing some or all logged values due to malfunctioning interfaces between system management circuit 205 and memory circuit 130.

It is also noted that the embodiment of FIG. 2 is one depiction for logging information in response to an expiration of a watchdog timer. Other embodiments may include a different combination of circuit elements. For example, although a single processor core cluster 210a is shown, any suitable number of processor core clusters may be included in other embodiments. Any suitable number of point-to-point interfaces may be included such that system management circuit 105 may be scaled to access any desired number of functional circuits. In some embodiments, more than one system management circuit may be included, with each instance of the system management circuit configured to access a respective subset of functional circuits. The communication fabric is depicted as a single bus, but, in other embodiments, may scale to include multiple buses across the integrated circuit.

The systems illustrated in FIGS. 1 and 2 describe a watchdog logging technique in which information related to the operation of an integrated circuit is logged in response to an expiration of a watchdog timer, and then stored for later access. The timing of signals during such a watchdog logging event may occur in various orders. One example of the timing of signals associated with an expiration of a watchdog timer is shown in FIG. 3.

Figure 3:
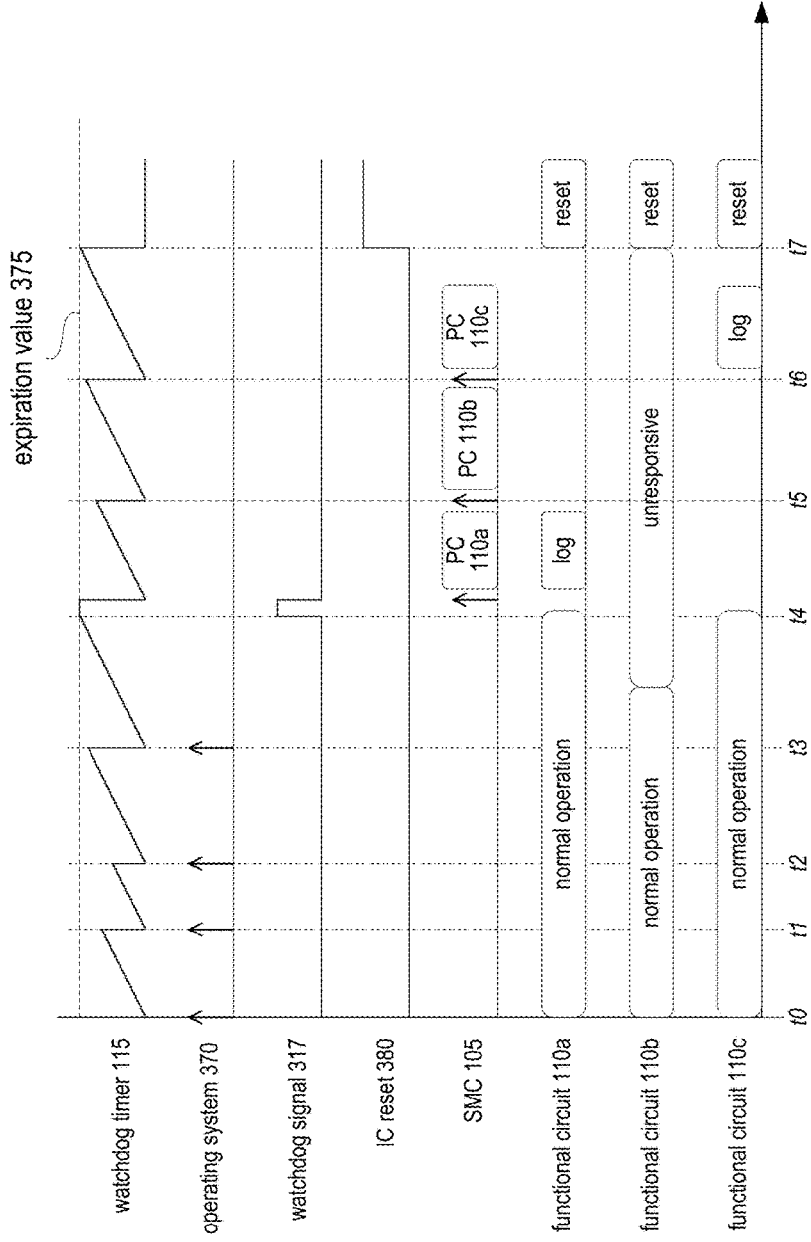
FIG. 3 illustrates a chart depicting activity associated with data logging of functional circuits.

Turning to FIG. 3, a chart depicting various signals within an integrated circuit are illustrated as a watchdog timer expires. Chart 300 depicts eight signals associated with integrated circuit 101 of FIG. 1. Watchdog timer 115 shows an indication of a counter value in watchdog timer 115. Expiration value 375 indicates a count value that corresponds to an expiration of watchdog timer 115. Operating system 370 indicates, with arrows, points in time at which an operating system, executing in functional circuit 110b for this example, resets watchdog timer 115. Watchdog signal 317 corresponds to a signal generated by watchdog timer 115 to indicate an expiration. IC reset 380 corresponds to a reset signal for integrated circuit 101. System management circuit (SMC) 105 depicts activity occurring in system management circuit 105. Functional circuits 110a-110c depict activity occurring respective ones of functional circuits 110.

As illustrated at time t0, operating system 370, executed by functional circuit 110b, resets watchdog timer 115 to an initial count value (e.g., zero). Watchdog signal 317 and IC reset 380 are de-asserted at this point in time. System management circuit 105 is idle, e.g., is not currently logging information from any of functional circuits 110, and all three functional circuits 110 are currently operating normally.

At times t1, t2, and t3, operating system 370 repeatedly resets watchdog timer 115, preventing watchdog signal 317 from being asserted. System management circuit 105 remains idle, and all three functional circuits 110 remain in normal operation. Between times t3 and t4, however, functional circuit 110b becomes unresponsive. Accordingly, operating system 370, running on functional circuit 110b, is unable to reset watchdog timer 115 before the count reaches expiration value 375 at time t4.

At time t4, watchdog signal 317 is asserted by watchdog timer 115 in response to the count value reaching expiration value 375. In response to the assertion of watchdog signal 317, normally operating functional circuits 110a and 110c are halted, as well as unresponsive functional circuit 110b. Halting of functional circuits 110 may be performed, for example, by asserting a halt signal that gates off one or more clock signals to functional circuits 110. In other embodiments, the halt signal may cause a respective subcircuit within a given functional circuit to stop its current task. In some embodiments, a given functional circuit may complete an in-progress task to reach a stable state before halting. In various embodiments, some or all of functional circuits included in integrated circuit 101 may be halted in response to the assertion of watchdog signal 317. For example, only functional circuits 110 that will be accessed for data logging may be halted, allowing other functional circuits to continue operation. The halted functional circuits may be configured to remain halted until a reset signal (e.g., IC reset 380) is received.

Halting of the functional circuits in response to the assertion of watchdog signal 317 may provide certain benefits. For example, by halting functional circuits 110 at an indication of improper operation within integrated circuit 101 may preserve the states that the functional circuits were in at the time that the unexpected event occurred that causes the improper operation, including microarchitectural states of processor cores, such as cores 212 in FIG. 2. These preserved states may then be logged and potentially used to identify a cause of the unexpected event.

In addition, halting the functional circuits may also increase a level of protection against a possible hacking attempt. A common approach to hacking into a computing device involves attempts to create an unexpected event by modifying voltage levels of power supplies and/or frequencies of clock sources in the device. Such modifications may cause the unexpected event and, therefore, the resulting data logging. A hacker may attempt to assuming control of one or more processor cores in the device, e.g., by use of a debugger system coupled to the device, and then forcing the controlled core to access memory locations that the normally executing software would not be accessing. By halting functional circuits, including cores, assuming control of the cores, even via a debugger system, may be avoided since the halted cores won't execute additional instructions until after a reset. Such a reset may further eliminate the unexpected event allowing the device to return to a normal operating state in which the hacker has no control of any cores. Furthermore, since restricted information is not captured in the data logs, a hacker's access to logged data may not provide information useful to the hacker.

After functional circuits 110 have been halted, system management circuit 105 may repeatedly reset watchdog timer 115 during the logging, as shown by the arrows from times t4 to t6. In some embodiments, a different watchdog timer may be used by system management circuit 105 rather than watchdog timer 115. In other embodiments, watchdog timer 115 may be used after system management circuit 105 selects different options, such as enabling IC reset 380 to be asserted in response to reaching expiration value 375.

After resetting watchdog timer 115, system management circuit 105 accesses functional circuits 110 in a particular order. In the example of chart 300, the access order is functional circuit 110a, followed by functional circuit 110b, ending with functional circuit 110c. System management circuit 105, by sending an access request via a point-to-point interface, causes functional circuit 110a to send information 150a to system management circuit 105. System management circuit 105 may initiate a response timer circuit in response to requesting information 150a from functional circuit 110a. This response timer circuit, independent of watchdog timer 115, counts for a period of time while waiting for functional circuit 110a to reply to the request for information 150a. If functional circuit 110a fails to respond before the response timer expires, then system management circuit 105 accesses a next functional circuit (e.g., 110b) in the particular order without receiving information 150a for the particular functional circuit.

Before time t5, however, functional circuit 110a responds with information 150a. After receiving all of information 150a, system management circuit 105 resets watchdog timer 115 and then request information 150b from the next circuit in the particular order, functional circuit 110b. System management circuit 105 initializes the response timer and waits for a reply from functional circuit 110b. Functional circuit 110b, however, remains unresponsive and does not send a reply before the response timer expires. It is noted that the timeout period for response timer, as shown, is less than the timeout period for watchdog timer 115. In some embodiments, this timeout period for the response timer may be implemented using software or firmware executed by system management circuit 105. For example, software may poll a current count value of watchdog timer 115 to determine if the appropriate timeout period has elapsed or not. Using software to implement this timeout period may allow for flexibility when setting the response timeout period, thereby enabling different timeout periods to be used for different functional circuits.

At time t6, in response to a determination that functional circuit 110b is unresponsive, system management circuit 105 accesses the next functional circuit in the particular order, functional circuit 110c, without receiving information 150b from functional circuit 110b. In place of information 150b, system management circuit 105 may, in some embodiments, include an indication of the lack of a response from functional circuit 110b in the collected information 150.

After time t6, system management circuit 105 requests information from the next functional circuit in the particular order, functional circuit 110c. The sent request causes functional circuit 110c to send information 150c to system management circuit 105. If functional circuit 110c is the final circuit in the particular order, then the data logging is complete. If, however, there are additional circuits to data log, then the process repeats by sending another request for information to the next functional circuit in the particular order and collected information from received responses.

In the present example, functional circuit 110c is the last functional circuit in the particular order. In response to completing the data logging, system management circuit 105 ceases to reset watchdog timer 115. As disclosed, watchdog timer 115 is currently configured to assert IC reset 380 in response to expiring. At time t7, watchdog timer 115 expires causing the assertion of IC reset 380. In the illustrated example, IC reset 380 causes a chip-wide reset of integrated circuit 101. In some embodiments, information 150 may be stored, prior to the assertion of IC reset 380, in a memory circuit 130 that is off-chip from integrated circuit 101. In other embodiments, memory circuit 130 may be included within integrated circuit 101, in which case IC reset 380 does not affect information 150 stored in memory circuit 130. The assertion of IC reset 380 causes integrated circuit 101 to reset which, in some cases, may clear any issues that caused functional circuit 110b to become unresponsive.

It is noted that FIG. 3 is merely an example of data logging in response to an expiration of a watchdog timer. The illustrated signals in chart 300 have been simplified for clarity and, therefore, are not intended to imply actual timing relationships.

The circuits and techniques described above in regard to FIGS. 1-3 may be performed using a variety of methods.

Two methods associated with performing a data logging operation in response to a watchdog timer expiration are described below in regard to FIGS. 4 and 5.

Proceeding to FIG. 4, a flow diagram for an embodiment of a method for data logging a plurality of functional circuits in response to an expiration of a watchdog timer is shown. Method 400 may be performed by, for example, integrated circuit 101 in FIGS. 1 and 2. Referring collectively to FIGS. 1 and 4, method 400 begins in block 410.

At block 410, method 400 includes repeatedly resetting watchdog timer 115 by software running on one or more of a plurality of processors on integrated circuit 101. As shown, one or more of functional circuits 110 include the plurality of processors. A particular processor executes an operating system or other type of system management software that repeatedly resets watchdog timer 115 to prevent an expiration of watchdog timer 115. As long as the particular processor continues to reset watchdog timer 115, then at least the particular processor may be assumed to be operating properly. While the software is running properly, it may additionally record values indicative of a current operating state in registers or memory locations that are accessible by system management circuit 105 after watchdog timer 115 expires. Such software annotations may provide additional history of specific events and/or conditions that might lead up to a subsequent expiration of watchdog timer 115.

Method 400 further includes, at block 420, in response to an expiration of watchdog timer 115, logging, by system management circuit 105 included on integrated circuit 101, information from functional circuits 110 via respective dedicated point-to-point interfaces 120. If the particular processor fails to reset watchdog timer 115, then a fault condition is considered to have occurred somewhere in system 100. Although the particular processor failed to reset watchdog timer 115, a cause for this failure may originate in other circuits in integrated circuit 101 or even elsewhere in system 100. System management circuit 105 logs data from functional circuits 110 to be stored, and eventually sent to a producer of system 100 and/or developer of software running on system 100.

In response to the expiration of the watchdog timer, functional circuits 110 are halted until a reset signal is received by functional circuit 110. This halting may preserve a current state of functional circuits 110 until information 150 associated with their current states can be logged by system management circuit 105. This logging includes circumventing, by use of point-to-point interfaces 120, communication fabric 125 included on integrated circuit 101. In some failure states, communication fabric 125 may be corrupted and, accordingly, unusable for requesting information 150 from functional circuits 110. Use of point-to-point interfaces 120 may circumvent communication fabric 125, thereby allowing the collection of information 150 to be performed.

At block 430, method 400 also includes storing information 150 in memory circuit 130 that retains stored values through a reset of integrated circuit 101. As described above, memory circuit 130 may, in various embodiments, be included within integrated circuit 101 or located externally. In either embodiment, memory circuit 130 is capable of retaining information 150 through a reset of integrated circuit 101 and/or a reset of system 100. Accordingly, after the reset has occurred and system 100 is once again operational, information 150 may be read from memory circuit 130 and sent to the producer/developer. It is noted that, in some embodiments, information 150 may be kept unencrypted as no sensitive information may be included within information 150.

Method 400 may end in block 430 or, in some embodiments, some or all operations of method 400 may be repeated. For example, method 400 repeats block 410 until watchdog timer 115 expires. It is noted that the method of FIG. 4 is merely an example for logging information in response to an expiration of a watchdog timer.

Moving now to FIG. 5, a flow diagram for an embodiment of a method for handling an unresponsive functional circuit and completing a data logging operating is illustrated. In a similar manner as method 400, method 500 may be performed by an integrated circuit 101 in FIGS. 1 and 2. Referring collectively to FIGS. 1 and 5, method 500 begins in block 510.

Method 500 at block 510, includes, logging, by system management circuit 105, functional circuits 110 in a particular order. As illustrated, a particular order may be used by system management circuit 105 to log information 150 from each of functional circuits 110. In some embodiments, the order may be predetermined by hardware circuits or firmware used by system management circuit 105. In such embodiments, the order may remain consistent over a lifetime of system 100. In other embodiments, the circuits or firmware may be configured to utilize a suitable selection algorithm for determining the order. For example, selection criteria may include recent states of functional circuits 110 including current power modes and/or clock frequency settings.

At block 520, method 500 includes, repeatedly resetting watchdog timer 115 by system management circuit 105 during the logging. As shown, system management circuit 105 may be configured to repeatedly reset watchdog timer 115 after the expiration occurs that triggers the data logging procedure. Since watchdog timer 115 was not reset by the normal operating methods, system management circuit 105 may assume responsibility for resetting watchdog timer 115. This may allow watchdog timer 115 to continue to be used in case of further unexpected events that prevent the logging operation. To such ends, a configuration of watchdog timer 115 may be modified to enable an IC reset to be trigger in case of another timeout of watchdog timer 115, rather than attempting to trigger another data logging procedure. In other embodiments, integrated circuit 101 may include more than one watchdog timer circuit and system management circuit 105 may reset a different watchdog timer than watchdog timer 115 during the data logging procedure.

At block 530, method 500 also includes, in response to determining that a particular functional circuit 110 is unresponsive, logging a next functional circuit 110 in the particular order without receiving respective information 150 for the particular functional circuit 110. Since the data logging procedure is activated in response to an unexpected event that results in watchdog timer 115 not being reset, it is contemplated that one or more functional circuits in integrated circuit 101 may not be operating properly and therefore may not be responsive to requests to provide their respective portions of information 150. For example, if functional circuit 110*b* is responsible (e.g., based on software being executing by functional circuit 110*b*) for resetting watchdog timer 115, then functional circuit 110*b* may be in a stuck state when failing to reset watchdog timer 115. Accordingly, functional circuit 110*b* may not be responsive to any requests or commands addressed to it.

In response to failing to receive information 150*b* from functional circuit 110*b*, system management circuit 105 will skip the collection of information 150b from functional circuit 110b and proceed to the next functional circuit 110 in the particular order (e.g., functional circuit 110c). For example, system management circuit 105 may initiate a response timer when sending the request for information 150b from functional circuit 110b. If the response timer expires before receiving any reply from functional circuit 110b, then functional circuit 110b is considered to be unresponsive and the logging moves to functional circuit 110c. In some embodiments, the response timer may be configured to expire in less time than watchdog timer 115, such that system management circuit 105 may reset watchdog timer 115 before moving to log functional circuit 110c.

Method 500 includes, at block 540, ceasing to reset watchdog timer 115 in response to determining that the logging has completed. After logging has completed, it may be desired to reset integrated circuit 101 in an attempt to clear the cause of the unexpected event that resulted in the expiration of watchdog timer 115 that caused the data logging procedure. To cause a reset of integrated circuit 101, system management circuit 105 may be configured to cease resetting watchdog timer 115. As stated, watchdog timer 115 may be modified during the data logging procedure to cause a reset signal to be asserted in response to a timeout. Accordingly, by not resetting watchdog timer 115 and allowing a timeout to occur, system management circuit 105 may cause a reset of integrated circuit 101.

In some embodiments, method 500 may end in block 540, or in other embodiments, may repeat some or all operations. For example, block 520 may be repeated as necessary to prevent watchdog timer 115 from expiring. Block 530 at may be repeated if more than one of functional circuits 110 are unresponsive. Performance of various operations of methods 400 and 500 may be performed concurrently. For example, operations of method 500 may be performed as a part of block 420 of method 400.

Figure 6:
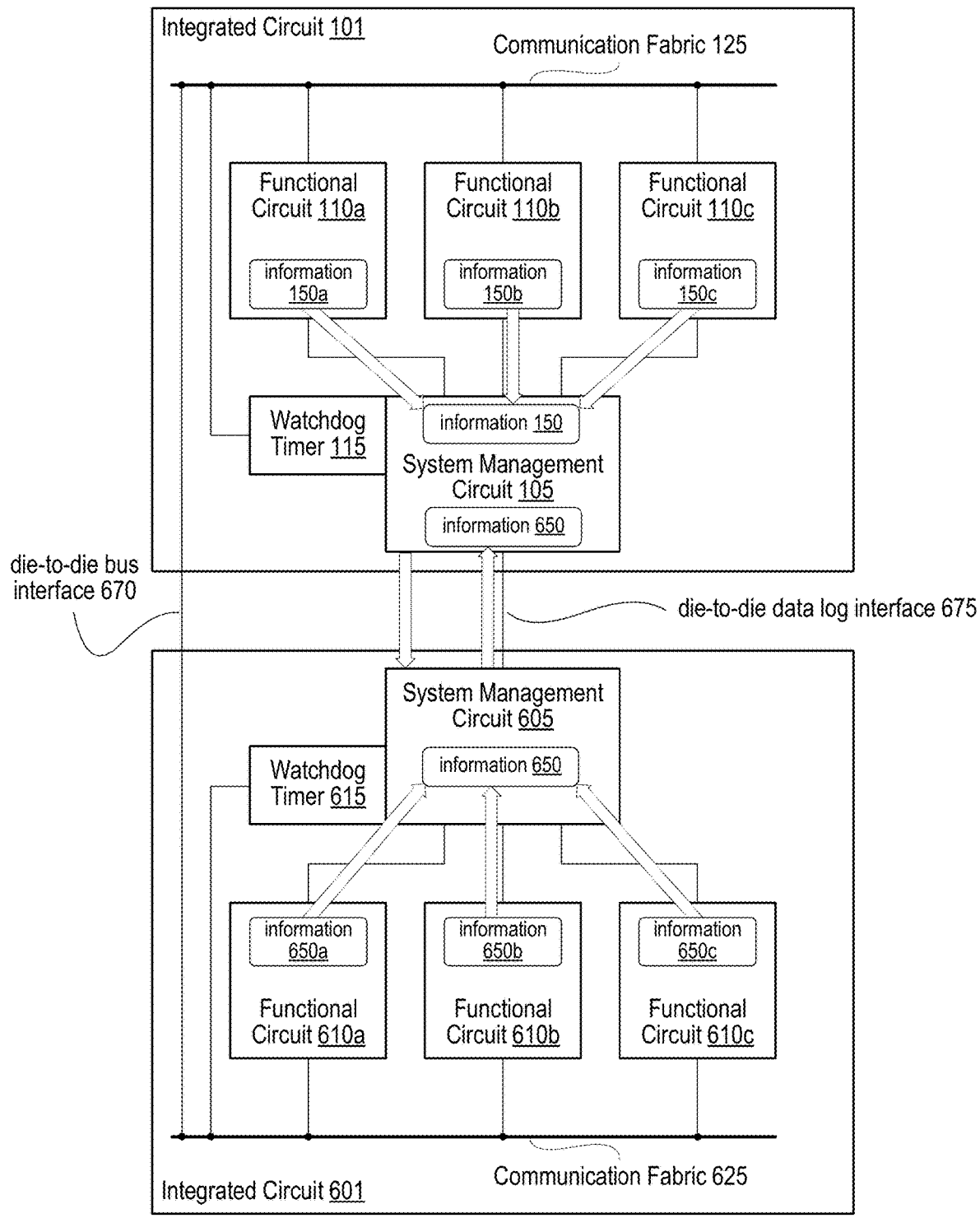
FIG. 6 illustrates a block diagram of an embodiment of a multichip system that includes multiple integrated circuits with respective system management circuits.

FIGS. 1-5 refer to circuits and methods for use with a single integrated circuit. It is contemplated, however, that these methods and described circuits may be used in a multichip system. FIG. 6 illustrates such a system.

Turning now to FIG. 6, system management circuits are depicted for use in a multichip system. As illustrated, multichip system 600 includes integrated circuit 101, from FIG. 1, coupled to integrated circuit 601 via die-to-die bus interface 670 as well as die-to-die data log interface 675. In various embodiments, integrated circuits 101 and 601 may be two instances of a same die design or different integrated circuits that support common die-to-die interface protocols.

Multichip system 600, as shown, allows for integrated circuits 101 and 601 to be coupled to perform operations, including, for example, execution of one or more software programs as if multichip system 600 were a single integrated circuit with the combined hardware resources of both integrated circuits 101 and 601. Such capabilities may enable various combinations of two or more of the integrated circuits. A variety of combinations may provide highly scalable system solution across a wide range of applications, thereby allowing, for example, use of smaller, less-expensive members of the family in cost sensitive applications and use of more-expensive, higher-performance members of the family in performance minded applications. Members of the family may also be combined with a small, low-power member for use in reduced power modes and a high-performance member for use when complex processes and/or many parallel processes need to be performed.

As illustrated, system management circuit 605 performs similar functions as described above for system management circuit 105 when integrated circuit 601 operates independently of integrated circuit 101. In multichip system 600, however, integrated circuit 601 operates as a secondary circuit while integrated circuit 101 operates as a primary circuit. As part of the primary circuit, system management circuit 105 performs primary duties for data logging across both integrated circuits 101 and 601. To perform the primary duties, system management circuit 105 may execute software and/or firmware as well as utilize various hardware circuits included in system management circuit 105. In contrast, system management circuit 605 may perform secondary duties utilizing only the hardware circuits within system management circuit 605. Such partitioning may allow programmability of data logging techniques to be centralized with system management circuit 105 and enable system management circuit 105 to utilize system management circuit 605 as an extension of included hardware circuits.

In a particular example, watchdog timer 615 may be inactive in multichip system 600, and an operating system or background monitor process may reset watchdog timer 115 within the timeout period as long as all systems are observed to be functioning properly across both integrated circuits 101 and 601. In response to an expiration of watchdog timer 115, however, system management circuit 105 may, as disclosed above, issue access requests, in a particular order, to ones of functional circuits 110. In addition, system management circuit 105 may use the hardware circuits of system management circuit 605 to issue access requests, in a particular order, to ones of functional circuits 610a-610c (collectively functional circuits 610). In some embodiments, system management circuit 605 may issue the respective access requests to functional circuits 610 concurrently with the issue of access requests to functional circuits 110. In other embodiments, all access requests may be issued serially, regardless of whether the destination functional circuit resides on integrated circuit 101 or 601.

In a different example, watchdog timer 615 may be configured to operate concurrently with watchdog timer 115. For example, the operating system or background monitor process may reset watchdog timer 115 within the timeout period as long as all systems are observed to be functioning properly on integrated circuit 101 and reset watchdog timer 615 within the timeout period as long as all systems are observed to be functioning properly on integrated circuit 601. In such an embodiment, different timeout periods may be used across the two integrated circuits, e.g., if the two integrated circuits are operating at different system clock frequencies. System management circuit 105, however, may still perform the primary duties for data logging across both integrated circuits 101 and 601. If either of watchdog timers 115 or 615 expires, then system management circuit 105 collects information 150a-150c and 650a-650c from both integrated circuits.

In either example, system management circuit 105 collects information 650a-650c by utilizing circuits of system management circuit 605. As shown, system management circuit 105 utilizes system management circuit 605 by issuing commands across die-to-die data log interface 675. Die-to-die data log interface 675 may be dedicated to data logging operations, and therefore, be isolated from die-to-die bus interface 670. Such separation may enable communication between the two integrated circuits even in the event that die-to-die bus interface 670 becomes slowed or inoperable due to the event that caused the watchdog timeout.

It is noted that the examples of FIG. 6 are merely for demonstrating the disclosed concepts. Although a particular number of elements are shown for each integrated circuit, any suitable number may be used in either integrated circuit. For example, two different die-to-die interfaces are shown, but in other embodiments, multiple bus interfaces may be utilized, such as separate processor core bus and memory bus interfaces.

Figure 7:
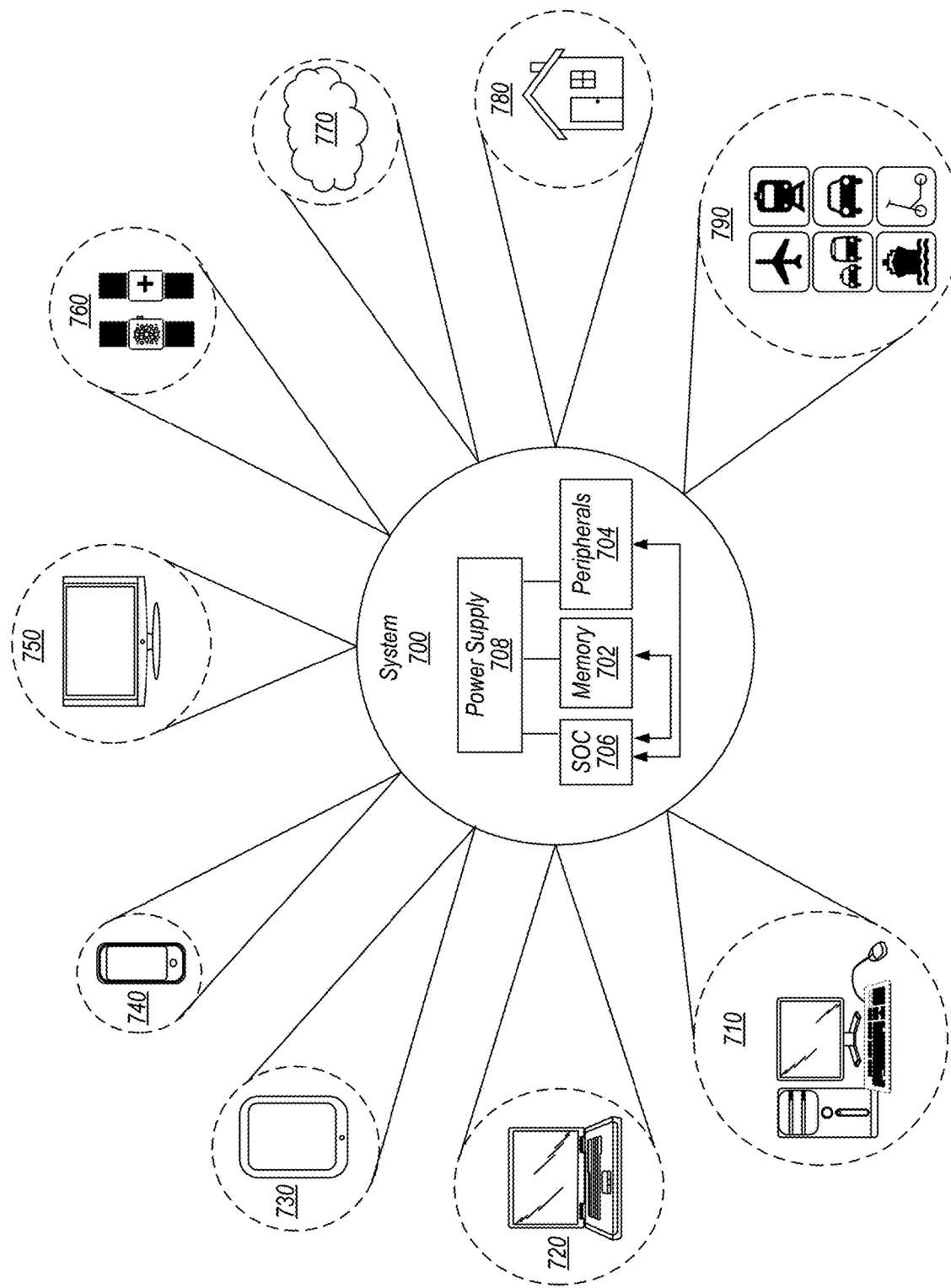
FIG. 7 depicts various embodiments of systems that include coupled integrated circuits.

FIGS. 1-6 illustrate circuits and methods for an integrated circuit that includes a system management circuit for performing data logging procedures of functional circuits in the integrated circuit. Any embodiment of the disclosed integrated circuits may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 700 is illustrated in FIG. 7. Computer system 700 may, in some embodiments, include any disclosed embodiment of integrated circuit 101, 201, 601, or combinations thereof.

In the illustrated embodiment, the system 700 includes at least one instance of a system on chip (SoC) 706 which may include multiple types of processing circuits, such as a central processing unit (CPU), a graphics processing unit (GPU), or otherwise, a communication fabric, and interfaces to memories and input/output devices. One or more of these processing circuits may correspond to an instance of functional circuit 110. In various embodiments, SoC 706 is coupled to external memory 702, peripherals 704, and power supply 708. In some embodiments, external memory 702 may correspond to memory circuit 130.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, memory 702 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 760 are contemplated as well, such as devices worn around the neck, devices attached to hats or other headgear, devices that are implantable in the human body, eyeglasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home 780 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise.

It is noted that the wide variety of potential applications for system 700 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 7 are illustrative only and are not intended to be limiting. Other devices are possible and are contemplated.

As disclosed in regard to FIG. 7, computer system 700 may include one or more integrated circuits included within a personal computer, smart phone, tablet computer, or other type of computing device. A process for designing and producing an integrated circuit using design information is presented below in FIG. 8.

Figure 8:
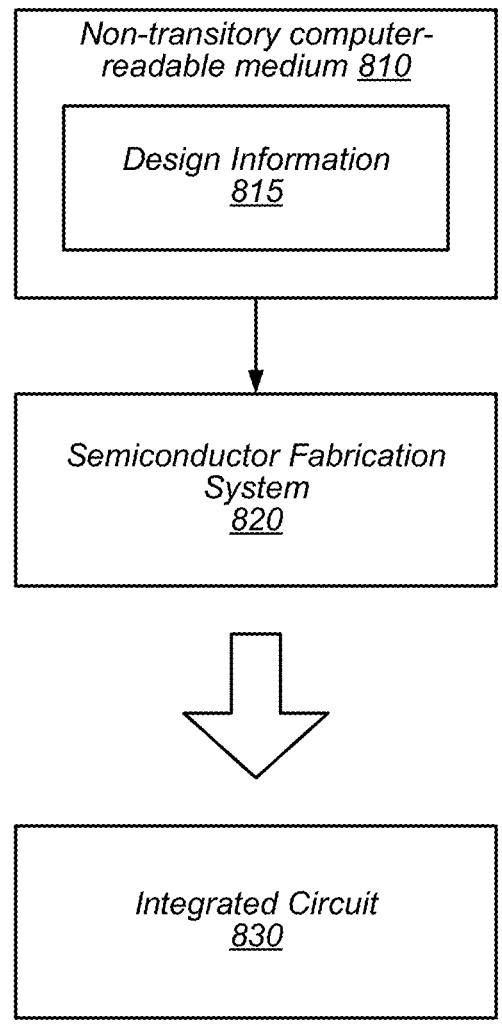
FIG. 8 illustrates a block diagram of an example computer-readable medium, according to some embodiments.

FIG. 8 is a block diagram illustrating an example of a non-transitory computer-readable storage medium that stores circuit design information, according to some embodiments. The embodiment of FIG. 8 may be utilized in a process to design and manufacture integrated circuits, for example, systems including one or more instances of integrated circuit 101 or 201 as shown in FIGS. 1 and 2. In the illustrated embodiment, semiconductor fabrication system 820 is configured to process the design information 815 stored on non-transitory computer-readable storage medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:
1. An apparatus, comprising:
a first integrated circuit die that includes:
   a first plurality of circuit blocks coupled together via a first communication fabric, wherein a first circuit block of the first plurality is configured to repeatedly:
      observe whether the first plurality of circuit blocks are operating properly; and
      in response to a determination that the first plurality of circuit blocks are operating properly, issue a first reset signal; and
a second integrated circuit die that includes:
   a second plurality of circuit blocks coupled together via a second communication fabric, wherein a second circuit block of the second plurality is configured to repeatedly:
      observe whether the second plurality of circuit blocks are operating properly; and
      in response to a determination that the second plurality of circuit blocks are operating properly, issue a second reset signal; and
a watchdog timer configured to initialize a count value in response to the first and second reset signals; and
a particular system management circuit coupled to the watchdog timer, and configured to:

in response to an expiration of the watchdog timer, access information in ones of the first and second pluralities of circuit blocks via respective point-to-point interfaces; and store the accessed information in a memory circuit.

2. The apparatus of claim 1, wherein the first integrated circuit die further includes a different system management circuit coupled to the particular system management circuit via a die-to-die data log interface; and wherein to access information in the ones of the first plurality of circuit blocks, the particular system management circuit is configured to issue access requests to the ones of the first plurality of circuit blocks using the different system management circuit.

3. The apparatus of claim 2, wherein the different system management circuit is configured to:

in response to receiving the access requests from the particular system management circuit, access information in ones of the first plurality of circuit blocks via a subset of the respective point-to-point interfaces.

4. The apparatus of claim 2, further comprising a die-to-die bus interface coupled to the first communication fabric and to the second communication fabric, wherein the die-to-die bus interface is separate from the die-to-die data log interface.

5. The apparatus of claim 2, wherein to access the information in the ones of the second plurality of circuit blocks, the particular system management circuit is configured to:

halt a first circuit block of the second plurality; and
cause the first circuit block to send the information to the particular system management circuit.

6. The apparatus of claim 5, wherein to access the information in the ones of the first plurality of circuit blocks, the particular system management circuit is further configured to:

cause the different system management circuit to halt a second circuit block of the first plurality; and
cause the second circuit block to send the information to the different system management circuit.

7. The apparatus of claim 1, wherein the particular system management circuit is further configured to access ones of the first and second pluralities of circuit blocks in a serial order.

8. The apparatus of claim 1, wherein the particular system management circuit is further configured to access ones of the first plurality of circuit blocks concurrent with accessing ones of the second plurality of circuit blocks.

9. The apparatus of claim 1, wherein the first integrated circuit die and the second integrated circuit die are heterogenous.

10. A method, comprising:

repeatedly issuing, by a first circuit block of a first plurality of circuit blocks included in a first integrated circuit die, a first reset signal;

repeatedly issuing, by a second circuit block of a second plurality of circuit blocks included in a second integrated circuit die, a second reset signal;

resetting, by a watchdog timer included in the first integrated circuit die, a count value in response to receiving both the first and second reset signals;

in response to an expiration of the watchdog timer, logging, by a particular system management circuit included in the first integrated circuit die, information from ones of first and second pluralities of circuit blocks via respective point-to-point interfaces; and storing the logged information in a memory circuit.

11. The method of claim 10, wherein issuing a given instance of the first reset signal includes:

observing whether the first plurality of circuit blocks is operating properly; and in response to determining that the first plurality of circuit blocks is operating properly, issuing the given instance of the first reset signal; and wherein issuing a given instance of the second reset signal includes:

observing whether the second plurality of circuit blocks is operating properly; and in response to determining that the second plurality of circuit blocks is operating properly, issuing the given instance of the first reset signal.

12. The method of claim 10, wherein logging the information from the ones of the second pluralities of circuit blocks includes:

sending, by the particular system management circuit included in the first integrated circuit die, access requests to a different system management circuit included in the second integrated circuit die; and accessing, by the different system management circuit, the information from the ones of the second plurality of circuit blocks via a subset of the respective point-to-point interfaces.

13. The method of claim 10, wherein logging the information from the ones of the first and second pluralities of circuit blocks includes serially accessing the ones of the first and second pluralities of circuit blocks.

14. The method of claim 10, wherein logging the information from the ones of the first and second pluralities of circuit blocks includes:

halting a given circuit block; and
causing the given circuit block to send the information to the particular system management circuit.

15. A multichip system, comprising:

a first integrated circuit die including:
 a first watchdog timer;
 a first plurality of circuit blocks, wherein a particular one of the first plurality of circuit blocks is configured to repeatedly reset the first watchdog timer; and
 a first system management circuit configured to:
  in response to an expiration of the first watchdog timer, log a first set of information for a subset of the first plurality of circuit blocks via a first set of respective point-to-point interfaces;

a second integrated circuit die including:
 a second watchdog timer;
 a second plurality of circuit blocks, wherein a particular one of the second plurality of circuit blocks is configured to repeatedly reset the second watchdog timer; and
 a second system management circuit configured to:
  in response to an expiration of the second watchdog timer, log a second set of information for a subset of the second plurality of circuit blocks via a second set of respective point-to-point interfaces; and
  send the second set of information to the first system management circuit;

wherein the first system management circuit is further configured to send the first and second sets of information to a memory circuit coupled to the first integrated circuit die.

16. The multichip system of claim 15, wherein to reset, in a given instance, the first watchdog timer, the particular one of the first plurality of circuit blocks is further configured to:

determine whether the first plurality of circuit blocks is operating properly; and in response to a determination that the first plurality of circuit blocks is operating properly, reset the first watchdog timer; and wherein to reset, in a given instance, the second watchdog timer, the particular one of the second plurality of circuit blocks is further configured to:

determine whether the second plurality of circuit blocks is operating properly; and in response to a determination that the second plurality of circuit blocks is operating properly, reset the second watchdog timer.

17. The multichip system of claim 15, further comprising a die-to-die data log interface coupled to the first and second system management circuits; and wherein the second system management circuit configured to send the second set of information to the first system management circuit via the die-to-die data log interface.

18. The multichip system of claim 15, wherein to log the first set of information for the subset of the first plurality of circuit blocks, the first system management circuit is further configured to serially access ones of the subset of the first plurality of circuit blocks; and wherein to log the second set of information for the subset of the second plurality of circuit blocks, the second system management circuit is further configured to serially access ones of the subset of the second plurality of circuit blocks.

19. The multichip system of claim 18, wherein the first system management circuit is further configured to serially access ones of the subset of the first plurality of circuit blocks while the second system management circuit serially accesses one s of the subset of the second plurality of circuit blocks.

20. The multichip system of claim 15, wherein the first integrated circuit die and the second integrated circuit die are heterogenous.

* * * * *